Patented Nov. 17, 1953

2,659,710

UNITED STATES PATENT OFFICE 2,659,710

PHENOL ALCOHOL-EPICHLOROHYDRIN REACTION PRODUCTS

Robert W. Martin, Lenox, Mass., assignor to General Electric Company, a corporation of New York No Drawing. Application July 26, 1951, Serial No. 238,763

7 Claims. (Cl. 260—58)

This application is a continuation-in-part of my earlier filed application, Serial No. 122,128, filed October 18, 1949, now U. S. Patent 2,579,329, issued December 18, 1951, and assigned to the same assignee as the present invention.

This invention is concerned with novel compositions of matter. More particularly, the invention relates to compositions of matter comprising compounds corresponding to the general formula.

I.
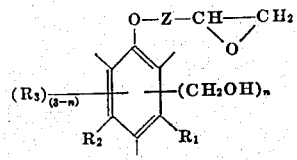

where Z is an alkylene radical, for instance, methylene, ethylene, propylene, isopropylene, butylene, etc., $R_1$, $R_2$, and $R_3$ are the same or different substituents selected from the class consisting of hydrogen, halogen, alkyl radicals, aryl radicals, and aralkyl radicals, and $n$ is a whole number equal to from 1 to 3. Among the groups which $R_1$, $R_2$ and $R_3$ may be in addition to hydrogen are, for instance, halogens, e. g., chlorine, bromine, fluorine, etc.; alkyl, e. g., methyl, ethyl, propyl, isopropyl, butyl, octyl, 2-ethylhexyl, decyl, etc.; aryl, e. g., phenyl, naphthyl, etc.; aralkyl, e. g., benzyl, phenylethyl, etc.

In my copending application, Serial No. 204,-466, filed January 4, 1951 now Patent No. 2,606,-934, August 12, 1952, and assigned to the same assignee as the present invention, the aforementioned application also being a continuation-in-part of my earlier filed application, Serial No. 122,128, there are disclosed and claimed compositions of matter comprising the product of reaction of a mixture of ingredients comprising (1) a methylol phenol corresponding to the general formula II.
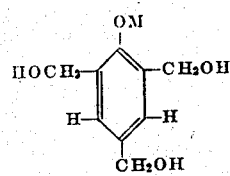

where M is a member selected from the class consisting of hydrogen, sodium, and barium, and (2) an alkylene oxide corresponding to the general formula III.
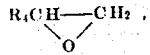

where $R_4$ is a member selected from the class consisting of hydrogen, aliphatic, alkoxy aliphatic, substituted aryl, aryl-substituted aliphatic, and aryloxyaliphatic radicals. The invention disclosed and claimed in the aforementioned application, Serial No. 204,466, also embraces reaction products of the alkylene oxide compound with methylol phenol derivatives corresponding to Formula II in which there are also present dimethylol phenol derivatives and monomethylol phenol derivatives in the mixture with the trimethylol phenol derivative of Formula II when the latter is reacted with the alkylene oxide. When the alkylene oxide and the mixture of methylol phenates are reacted together, there are formed reaction products which may have aliphatic alcohol residues attached both to the phenolic oxygen and to the methylol oxygen as a result of the reaction of the alkylene oxide ring with the various reactive groups on the benzene nucleus whereby the alkylene oxide ring opens up to give an aliphatic hydroxyl group. It will thus be apparent that when one employs non-halogenated alkylene oxides with the methylol phenol derivatives, there is an opening up of the alkylene oxide ring and attachment of the alkylene oxide residue to the phenolic oxygen and also, to a lesser extent, to the oxygen of the methylol groups. Compositions in which reaction of the alkylene oxide is mainly with the phenolic oxygen can be cross-linked merely by the application of heat.

I have now discovered that in contrast to the results obtained above if one employs an alkylene oxide corresponding to the general formula IV.
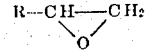

where R is a halogen-substituted aliphatic radical, for example, chloromethyl, chloroethyl, chloropropyl, bromoethyl, etc., for reaction with a composition comprising a compound corresponding to general formula

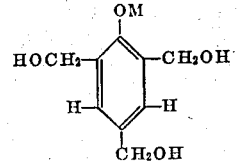

or with mixtures of organic compounds corresponding to the general formula

V.
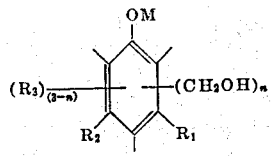

where M, $R_1$, $R_2$, and $R_3$, and $n$ have the meanings given above, and M in addition may be potassium, and preferably, although not essentially, $n$ is equal to 3, the epihalogenohydrin having the general Formula IV (which for brevity hereinafter will be referred to as the "hydrin") reacts preferentially with the —OM radical on the benzene nucleus to give a reaction product having the general Formula I or mixtures of reaction products coming under general Formula I in which the epoxide group is at least partially intact. Concomitantly, some of the epoxide groups may be hydrolyzed during preparation of my claimed compositions to open the epoxide ring to give the corresponding hydroxy derivative, or may intercondense among themselves to give polymers. The reaction products defined by Formula I can be heated at relatively high temperatures, for example, for periods of from about 1/3 to one hour or more at around 150° to 200° C. without loss of formaldehyde and without going to a cross-linked structure, due to the unexpected marked stability of the methylol groups caused by reaction of the epihalogenohydrin with the phenolic oxygen atom. If it should be desired thereafter to effect condensation or obtain any increased functionality of the compounds or mixture of compositions corresponding to general Formula I, it is possible to effect such cross-linking or further intercondensation by the use of, for example, various acid mediums whereby residual epoxide structures may be opened up and thus form a new point of attachment between adjacent molecules.

The starting methylol phenyl derivative corresponding to general formula

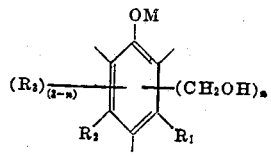

where M is a member selected from the class consisting of hydrogen, sodium, potassium, or barium, and $R_1$, $R_2$ and $R_3$ are members selected from the class consisting of hydrogen, halogen, alkyl, aryl, and aralkyl radicals may be prepared by a variety of methods. The compound represented by Formula II may be preformed and isolated prior to addition of the hydrin or it may be formed in situ in the form of a mixture of ingredients to which may be added the hydrin compound to form the claimed compositions of matter.

One preferred method for making the methylol phenyl derivatives corresponding to Formula V which hereinafter will be referred to as the "methylol phenyl derivative" comprises effecting reaction between about 1.5 to 3 mols of formaldehyde, preferably from about 1.8 to 2.5 mols formaldehyde, per mol of the phenol derivative corresponding to general formula
VI.

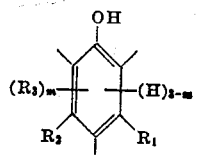

and $m$ is a value equal to from 0 to 2 and preferably $m$ is 0, and $R_1$, $R_2$, and $R_3$ have the meanings given above. The reaction is conducted at a temperature such that no resinous material is formed. This temperature has been found to range, for instance, from about 15° C. up to about 65° C., above which temperature undesirable side reactions may take place. The reaction is conducted in the presence of about 1 mol of alkali or alkaline hydroxide as, for example, sodium hydroxide, potassium hydroxide, and barium hydroxide per mol of the phenol. If it is desired to obtain the isolated salt of, for instance, the sodium or barium methylol phenate derivative, it can be precipitated by diluting or pouring the reaction mixture into a suitable water-miscible solvent and separating the salt from the liquid by filtration, decantation or other suitable means.

While the example above calls for molar quantities of alkali or alkaline hydroxide, only catalytic quantities of alkali, for example, about 1 per cent, by weight, are required for the phenol-formaldehyde reaction. It will be seen, therefore, that the phenol and formaldehyde may be allowed to react to form the mono-, di- or trimethylol compounds, for example, in the presence of a small amount of alkali at which time the rest of the alkali may be added to form the salt.

When it is desired to effect precipitation of, for instance, the sodium trimethylol phenyl salt, many solvents have been found suitable for this purpose for precipitating it, e. g., methanol, ethanol, n-propanol, isopropanol, tertiary butanol, isobutanol, n-butanol, tertiary amyl alcohol, allyl alcohol, diacetone alcohol, butyl carbitol, pyridine, phenyl cellosolve, acetone, acetonitrile, morpholine, dioxane, etc. In general, alcohols with no more than four carbon atoms are the most efficient precipitating agent and particularly those with two or three carbon atoms. The preferred precipitating agents are ethanol, propanol, isopropanol and acetone. Of these ethanol is most suitable from the point of view of low cost, availability and purity of the product obtained. Mixtures of the above precipitating agents also have been found to be very useful. Among the mixtures which are suitable are, by volume, 50–50 n-butanol and methanol, 50–50 methanol and acetone, and 50–50 n-amyl alcohol and methanol. Of the preferred metal hydroxides found to be suitable for the preparation of the salts or mixtures of salts of the methylol phenyl derivative, for example, 2,4,6-tris(hydroxymethyl) phenols or the salts of mixtures of the hydroxymethyl phenols, for example, mixtures containing from 1 to 3 hydroxymethyl groups attached to the phenyl radical by carbon bonds, sodium hydroxide, potassium hydroxide, and barium hydroxide are most desirable.

It is desired to point out that generally it is not necessary to isolate any particular methylol phenate derivative or derivatives corresponding to the general formula of Formula V prior to reaction with the hydrin since such reactions can be effected in the same mixture which comprises the reaction product of the phenol derivative described in Formula VI with the formaldehyde or paraformaldehyde in the presence of the aforesaid metal hydroxide.

The extent of the reaction between the hydrin and the methylol phenate will depend in many instances on the reactivity of the hydrin and the duration of the reaction. The reaction between the phenate corresponding for the most part to general Formula V and the hydrin will result in formation of compositions embraced by Formula I whereby derivatives may be formed comprising phenates containing from 1 to 3 methylol groups attached to the benzene ring.

In the following examples, methods are disclosed for preparing the sodium and barium salts of trimethylol phenol which can then be reacted with the hydrin. Instead of using phenol, other phenols having the general Formula VI may be employed with similar results.

The sodium and barium salts of trimethylol phenol may be formed very simply and isolated as crystalline compounds if desired. More particularly, the crystalline sodium and barium salts of trimethylol phenol may be prepared by effecting reaction between about 3 mols of formaldehyde and 1 mol of phenol in the presence of about 1 mol of alkali such as hydroxides of sodium and barium at temperatures such that no resinous material was formed. Sizable yields of the trimethylol derivative are formed when less than 3 mols, e. g., 1.5 to 2.5 mols, formaldehyde are used.

The following examples illustrate the preparation and isolation of the sodium and barium salts of trimethylol phenol or 2,4,6-tris(hydroxymethyl) phenol, if it is desired to employ the isolated trimethylol phenyl derivatives.

Example 1

To 188 parts, by weight (2 mols), of phenol were added 90 parts, by weight (2.25 mols), of sodium hydroxide which had been previously dissolved in 70 parts, by weight, of water. The mixture was cooled and allowed to crystallize. Five hundred eighty-eight (588) parts, by weight (7.3 mols), of formalin (37.2%, by weight, formaldehyde) were added and a mixture stirred. The temperature of the reaction mixture rose spontaneously to a maximum of 45° C. and then dropped slowly. The mixture was kept at room temperature 15 to 20 hours, dehydrated under vacuum with heat until the temperature in the flask rose to 45° C. and poured into several times its volume of ethanol. After 3 to 4 hours, the resultant precipitate of sodium trimethylol phenate was filtered and dried. This gave an actual yield of 335 parts, by weight, of the sodium salt which represents a yield of 81.3 per cent calculating the theoretical amount as 412 parts, by weight.

Example 2

Formalin in the amount of 100 parts, by weight (1.73 mols), 47 parts, by weight (0.5 mol), phenol, and 47 parts, by weight (0.55 equivalent), anhydrous barium hydroxide dissolved in 75 parts, by weight, of hot water, were mixed in that order. The reaction mixture was kept at a temperature of 30° C. or lower for 2 hours. The mixture was allowed to react for 24 hours at room temperature. Ethanol in the amount of 1600 parts, by weight, was added with vigorous mechanical stirring. The resultant precipitate of barium trimethylol phenate, after standing a few hours, was filtered off, washed with acetone and dried in a vacuum desiccator. The yield was 97.9 parts or 77.8 per cent of the theoretical amount.

Example 3

To 76.2 parts, by weight (0.945 mol), of formalin were added while stirring 23.5 parts, by weight (0.25 mol), of phenol and 12 parts, by weight (0.33 mol), of sodium hydroxide, dissolved in 15 parts, by weight, of water. The temperature of the reaction mixture was held at 30° C. or less for 2 hours. The mixture was then heated in an oven for 22 hours at a temperature of 40° C. Thereafter, 804 parts, by weight, of n-propanol was poured into the reaction mixture and this mixture stirred. The resulting precipitate was filtered, washed with acetone and ether and dried in a vacuum desiccator to give 50.8 parts, by weight, of the isolated derivative of sodium trimethylol phenate which represented a 98 per cent yield.

Other methods for making sodium and barium salts of symmetrical trimethylol phenol or mixtures of methylol phenols, or of making the potassium or calcium salts using the same procedure, are more specifically disclosed in my aforementioned copending application, Serial No. 122,128, which by reference is made a part of the present application as to all its disclosures. The latter application also discloses steps taken to identify the salts formed as being actually the ones claimed to have been obtained.

It is to be noted that consistent with the rules of orientation only those phenols possessing free reactive hydrogen atoms in all three positions ortho and para to the phenolic hydroxyl group can form trimethylol compounds, e. g., phenol, m-cresol and 3,5-xylenol. However, from actual experiment, it has been found that 3,5-xylenol forms a product in which the salts of the uni- and bis(hydroxymethyl) compounds predominate along with resinous products. No evidence has been obtained of the formation of the salt of the tris-(hydroxymethyl) compound. When m-cresol is used only low yields of the salt of tris(hydroxymethyl) compounds can be obtained due to the fact that the resins are readily formed. From the examples given above, it will also be noted that the reaction may be carried out at various temperatures, the lower temperatures ranging at around 0° C. requiring a reaction time of several days, while the reaction at temperatures around 60° C. takes place in several hours. However, temperature of over 65° C. will cause undesirable side reactions.

After the preparation of the methylol metal phenates described above, the latter may then be caused to react with the hydrin compound corresponding to the general formula

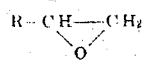

where R is a halogenated aliphatic radical, for example, a chloromethyl radical. For each mol of metal phenate prepared as described above, I may employ at least one mol of the hydrin, for example, 1 mol of epichlorohydrin. If desired, more than one mol of the hydrin may be used per mol of the methylol phenate. Thus, I may use from about 1 to 1.5 or more mols of the hydrin per mol of the metal phenate. Reaction occurs preferentially with the —OM group on the phenyl nucleus, where M has the meaning given above, but may also occur to some extent with the methylol groups. The latter reaction with the methylol groups takes place generally after the —OM group has been satisfied and the phenolic groups blocked.

From an economical point of view, it is advantageous to use reaction products produced from a mixture of the uni-, bis-, and tris(hydroxymethyl) compounds where the tris(hydroxymethyl) derivative is present preferably, though not essentially, in an amount, by weight of the mixture of over 25 per cent or more, for example, an amount over 50 per cent. I do not, however, intend to be limited to this per cent of the tris(hydroxymethyl) derivative since smaller (e. g., 10 to 40 per cent) or larger per cents (e. g., from 40 to 90 per cent) of the total of the uni- and bis(hydroxymethyl) phenyl compounds corresponding to the general formula

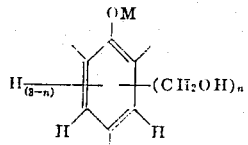

where M has the meaning given above and $n$ is an integer equal to from 1 to 2, inclusive, may also be used without departing from the scope of the invention. The following example illustrates the preparation of a composition corresponding to the general formula described above in Formula I. All parts are by weight.

*Example 4*

In this example, 8.4 grams p-cresol dialcohol having the formula

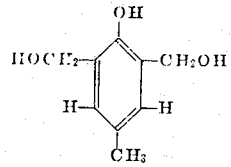

was dissolved in a solution of 20 parts water, 10 parts alcohol and 2 parts sodium hydroxide. This latter solution was added to a solution of 5.22 grams of epichlorhydrin in 5 cc. of ethyl alcohol during an interval of 50 minutes while holding the temperature at 50° C. The reaction mixture was then heated to 80° C. for one hour. During this time, an oily phase formed. This was separated, washed with dilute sodium hydroxide and then with water. The product thus obtained was a light amber syrup. This product comprised a compound (and probably condensation products thereof) corresponding to the formula

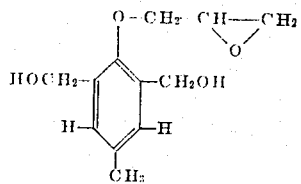

Part of this product was dissolved in alcohol and 3 per cent, by weight, toluene sulfonic acid, based on the weight of the product, was added. This solution had a stroke cure of 7 seconds on a hot plate maintained at 150° C. and 3 seconds at 180° C. on the same hot plate. This stroke cure was obtained by placing a small amount of the product on a flat heated surface and stroking the sample with a spatula gently until the sample had gone from the stringy stage to the substantially infusible insoluble state. A 3-mil wet film was prepared on a glass slide and cured by baking 10 minutes at 150° C. The film was very hard and tough and unlike other phenolic films, the film had practically no color. In addition, the adhesion of the film to glass was excellent.

*Example 5*

In this example 12.4 grams of saligenin

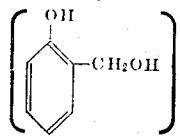

was dissolved in a solution containing 30 grams of water, 15 grams of alcohol and 4 grams of sodium hydroxide. This solution was added to a solution of 11 grams of epichlorohydrin dissolved in 11 cc. of alcohol at a temperature of 50–60° C. during a 15 minute interval. The reaction mixture was then heated to 80° C. for one hour. The organic layer which formed was separated, washed with dilute sodium hydroxide and then with water. The product was heated to 110° C. to remove dissolved water. When 2 per cent, by weight, thereof of para-toluene sulfonic acid was added, the product cured slowly at 180° C. to the infusible insoluble state. However, with 5 per cent para-toluene sulfonic acid, a very rapid cure was obtained. A film with 5 per cent acid was prepared on a glass slide using alcohol as a solvent for the varnish. The film after a 30 minute bake at 150° C. was hard, tough and showed excellent adhesion to the glass. The film had a faint straw color.

The liquid products such as those formed in Examples 4 and 5 can be bodied to give solids which are also suitable for use in surface coatings, castings, etc. Solid products having the advantage of greater ease in handling also give tack-free films upon evaporation of the solvent. A solid polymer was prepared as follows from a product such as that described in Example 4. 8.79 grams of the epoxide product was mixed with 0.09 gram p-toluene sulfonic acid in the form of an ethyl alcohol solution. The alcohol was boiled off and the mixture heated at 180–200° C. until a test drop gave a hard brittle resin when cool. During the bodying of the epoxide product, the material became somewhat lighter in color. The bodied material was dissolved in ethyl alcohol and more para-toluene sulfonic acid added. A film prepared from the solution was hard, tough, infusible and insoluble after curing at 150° C.

*Example 6*

In this example, 425 grams phenol was dissolved in a solution consisting of 310 grams of 87 per cent KOH and 200 grams of water. The solution was cooled and 720 grams of 37.5 per cent formalin were added. The mixture was allowed to react at 30–40° C. for 2 hours and at 25–30° C. over approximately 70 hours. The above reaction product was reacted with 463 grams of epichlorohydrin in 450 grams of ethyl alcohol, the phenate solution being added to the epichlorohydrin solution at around 50° C. The reaction mixture was stirred vigorously throughout the addition. The temperature rose spontaneously to 90° C. where it was kept for 10 minutes. It was then allowed to cool slowly and the product was washed several times in water and then dehydrated. There was thus obtained 547.5 grams of a light amber very viscous syrup. This material comprised a mixture of methylol phenyl derivatives corresponding to the formula

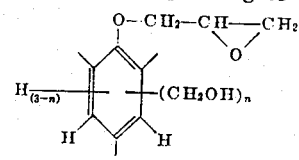

where $n$ is an integer equal to from 1 to 3, inclusive. Analysis of the product for methylol content by the method disclosed in Analytical Chemistry, June 1951, described in an article by R. W. Martin entitled "Simple Methylol Determination" showed it to contain 28.3 per cent methylol as compared to the theoretical of 29.6 per cent. Epoxide analysis showed the presence of 0.31 milliequivalents epoxide per gram sample. When a sample of this material was heated at 200-230° C. in an open vessel, the material condensed to yield a hard grindable resin. No darkening occurred during the heating. The final product was soluble in acetone-alcohol mixtures.

*Example 7*

About 12.13 parts of the product obtained in Example 6 was heated rapidly to 230° C. in an open vessel. The product lost about 1.12 parts in weight. It was then mixed with 11 parts of linseed oil fatty acids and again heated to 230° C. for 30 minutes. At this point the acid number was 14.6 showing very rapid esterification. The product was dissolved in 9 parts of hexane and 2 parts of drier solution containing 0.2 per cent cobalt and 0.5 per cent lead was added. A 3-mil wet film was spread on a glass slide. The film was dust-free in two minutes but showed some tackiness. The above data demonstrates the ease of esterification and possibility of obtaining very rapid dust-free varnishes.

*Example 8*

336 parts of para-cresol dialcohol was dissolved in a solution of 80 parts sodium hydroxide, 1200 parts of water and 473.4 parts of alcohol. This solution was added slowly with rapid stirring to a solution of 225 parts of epichlorohydrin in 225 parts of ethyl alcohol. The addition required 30 minutes during which time the temperature was maintained at 50-60° C. The mixture was then heated to 80° C. for 65 minutes. Most of the alcohol and part of the water were distilled off under a vacuum. The residue was washed three times with water and then heated in an open vessel to 110° C. to yield 278 parts of a viscous honey colored syrup which could be readily converted to an infusible insoluble product by use of small amounts of acidic materials such as the above used para-toluene sulfonic acid.

*Example 9*

In this example 273 grams of phenol were dissolved in a solution of 120 grams of sodium hydroxide in 180 ml. of H₂O. The solution was cooled to 25° C. and 410 ml. formalin (40% by volume) were added. The mixture was held at 40° C. for 30 minutes and about 30° C. for 16 hours. The reaction mixture which comprised a mixture of methylol phenates was added over a period of 30 minutes to a solution of 310 grams of epichlorohydrin in 310 ml. of alcohol held at 55-60° C. The mixture was then heated at 80° C. for 1 hour, the product washed twice with water and then dehydrated under a vacuum to a pot temperature of 70° C. There was thus obtained 529 grams (88% of the theoretical) of almost colorless syrup. With no added catalyst, the material did not cure to the hard infusible state even when heated after 25 minutes at 200° C. However, the incorporation of small amounts of acidic materials rapidly converted the syrup to the substantially infusible and insoluble state.

*Example 10*

In this example 198 grams of p-phenylethyl phenol were dissolved in a solution of 42 grams sodium hydroxide in 160 grams water. This solution was cooled to 25° C. and 170 ml. of formalin (40% by volume) was added. The mixture was heated at 60-70° C. for ½ hour and at 50-60° C. for ½ hour. The product was then added over a period of about 25 minutes to 110 grams of epichlorohydrin dissolved in 50 grams of alcohol and 50 grams of water heated to 50-55° C. The mixture was held at 55° C. for an additional 30 minutes and thereafter the product was washed with water and dehydrated by heating to 105° C. to yield 266.5 grams of a light brown low melting brittle resin. Assuming complete reaction of both the formaldehyde and the epichlorohydrin, the yield would have been 314 grams. This product could be heated at around 150° C. with a slight trace of acid (0.1%, based on weight of the phenol derivative) or no catalyst at all to give bodied hard brittle resins which were still soluble and fusible and did not lose formaldehyde on heating. However, the addition of larger amounts of acid converted the material to the infusible and insoluble state.

*Example 11*

This example illustrates the preparation of a large batch of epoxide resin in which the methylol phenate derivative was prepared in situ so as to give a mixture of methylol phenols, that is, a mixture in which the uni, bis-, and tris-(hydroxymethyl) phenyl derivatives were present. More particularly, 1.83 kg. water, 8.34 kg. phenol, and 7.33 kg. of 50 per cent aqueous sodium hydroxide were placed in a 15 gallon stainless steel kettle and the temperature of the mixture was adjusted to 40° C. by means of heated circulating water through the jacket surrounding the kettle. 14.4 kg. of 37 per cent aqueous formalin was added slowly during the next 15 or 20 minutes and the mixture was held at 40° C. with constant agitation for a period of 30 minutes after all the formalin had been added. The resulting product was cooled to room temperature at around 25-28° C. and allowed to stand about 15 hours. This product, which is identified as product "A," was drawn off into a container. Thereafter, 9.48 kg. ethanol and 9.48 kg. epichlorohydrin were charged to the same kettle and the temperature adjusted to about 58-60° C. Product "A" was added to the kettle over a 30 minute period after which the mixture was reacted at 80° C. with stirring for one hour. The mixture was cooled to 50° C. and the ethanol removed by vacuum stripping. The product was cooled to 30° C. and decanted by removing the water from the top of the reaction mixture. The cooled product had a pH of 9.7. 40 lbs. of water and 700 grams of 37 per cent aqueous HCl were added to the mixture and the product washed by agitation at 60° C. for 30 minutes, cooled to 20-25° C. and the water layer again decanted so as to give a product having a pH of 8.8. The product was again washed with 50 lbs. water followed by 41 grams of 37 per cent aqueous HCl and the washing carried out with agitation at 60° C. for 30 minutes and thereafter cooled. The water was decanted and at this point the product had a pH of 8.2. The product was then dehydrated under a vacuum of 27" mercury to give 10.67 kg. of an epoxide resin which comprised 57 per cent of the theoretical amount. Analysis of the resin showed it to contain 21.9 per cent methylol groups and an epoxide value of 0.26 milliequivalents per gram. This resin could be dissolved in various solvents and could be bodied at elevated temperatures to give fusible soluble products either with or without additional small amounts of acid. The unbodied or bodied materials could then be converted to the insoluble and infusible state by the incorporation of larger amounts of acid into the mixture.

It will, of course, be apparent to those skilled in the art that when using methylol phenates corresponding to Formula II or mixtures corresponding to Formula V, that where M is hydrogen, for adequate reaction with the hydrin corresponding to the Formula IV, the phenolic hydroxy group is preferably converted to the metallic phenate as is shown in Formulas II and V. It will also be apparent that instead of the epichlorohydrin employed in the foregoing example, other hydrins corresponding to the general formula

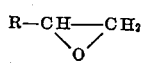

where R is a halogenated saturated aliphatic radical other than the chloromethyl radical in epichlorohydrin, for instance, chloroethyl, chloropropyl, etc., may be used without departing from the scope of the invention. In addition, instead of using the particular phenol or phenols described in the foregoing examples, other substituted phenols coming within the general formula described in Formula VI may be employed instead.

The molar ratio of the hydrin and the particular methylol phenate employed may also be varied within wide limits. Thus, although it is preferable to employ at least the same number of mols of hydrin, for example, epichlorohydrin, as there are phenolic hydroxyl groups or potential hydroxyl groups attached to the phenyl nucleus as, for example, the —OM group on the benzene nucleus where M is, for instance, sodium, potassium, and barium, it will be apparent that smaller molar amounts of the hydrin may also be used whereby it is possible to obtain derivatives of only some of the phenyl-bonded OM groups in admixture with unmodified methylol phenol and methylol phenates.

The conditions of reaction for obtaining my claimed reaction products may also be varied. The reaction to form the methylol phenate may be carried out at temperatures ranging, for example, from about room temperature to as high as 60–65° C. As pointed out previously, temperatures in excess of 65° C. show a decrease in the yield of the desired compounds since at temperatures above 65° C. resinification of the methylol groups may begin to take place and increases rapidly as the temperature rises. However, reaction between the hydrin and the methylol phenate may be conducted at higher temperatures, for instance, as high as 75–100° C., preferably between 60–80° C., without undue condensation of the methylol groups.

The claimed compositions of matter are useful as intermediates in the preparation of other materials, particularly esters thereof whereby esterification can take place on the hydroxyl groups of the remaining methylol groups to produce esters which are useful, for example, as plasticizers for various resins, particularly vinyl halide resins, for example, polyvinyl chloride, copolymers of vinyl chloride and vinyl acetate, etc.

The compositions described above are also useful in casting and coating applications. Thus it has been found possible to add small amounts, for example, from about 0.01 to 5 to 10 per cent or more, by weight, thereof of an acidic material, for example, para-toluene sulfonic acid, phenol sulfonic acid, small amounts of sulfuric acid, hydrochloric acid, acid type salts, chloroacetic acid, etc.

The compositions of matter herein described may be mixed with the various acidic catalysts in amounts ranging from about 0.1 to 3 to 5 per cent, by weight, or more based on the weight of the methylol phenyl epoxide derivative to effect conversion of the epoxide material to the insoluble and infusible state. Such heat-convertible compositions may also be used in various molding and laminating applications. Thus, the epoxide compositions herein described and claimed may be mixed with such fillers as, for instance, iron oxide, lithopone, silica, zinc oxide, or with other fillers such as finely divided glass fibers, asbestos floats, mica flakes, etc. The mixture containing suitable catalysts may be rolled on Banbury mixers and thereafter subjected to heat and pressure in molds to form molded products. In the case of making laminated products, sheets of material, for example, glass fiber cloth, asbestos cloth, or asbestos paper may be coated and impregnated with the epoxide compositions preferably containing small amounts of acidic cure accelerators, and thereafter the sheets superposed on each other and pressed under heat and pressure to give cohesive laminated panels.

The compositions of matter herein described may also be employed as intermediates in the manufacture of alkyd-type resins as, for example, those formed by the reaction of, for instance, glycerine and phthalic anhydride. Thus, compositions of matter corresponding to Formula I on the first page of this application or mixtures of such compositions may be used as the polyhydric alcohol for reaction with a polycarboxylic acid or anhydride. Thus, the compound (which may contain polymers thereof) having the formula

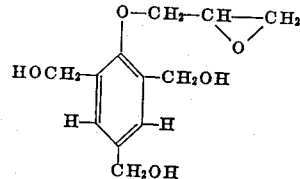

or a composition comprising a mixture of compounds (which may contain polymers thereof) having the general formula

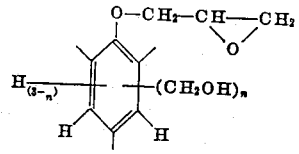

where $n$ is an integer equal to from 1 to 3, inclusive, may be reacted with a polycarboxylic acid or anhydride, for example, phthalic acid or anhydride, oxalic acid, succinic acid, malonic acid, isophthalic acid, terephthalic acid, chlorinated phthalic acids or anhydrides to give alkyd resins having unique and desirable properties due to the presence of the phenyl nucleus. If desired, in addition to the methylol phenols used with the polycarboxylic acid, other monohydric and polyhydric alcohols, as well as other monocarboxylic acids, may be used as modifying agents for the compositions of matter described immediately above. Thus, in addition to the methylol phenyl derivative described for use above, one may also employ for this purpose such materials as, e. g., glycerine, pentaerythritol, ethylene glycol, acetic acid, propionic acid, adipic acid, etc. In addition, where it is desired to prepare oil-modified alkyd resin compositions, various drying and non-drying oils, either occurring naturally or prepared synthetically may be incorporated at the same time that the methylol phenol derivative is reacted with the polycarboxylic acid or such oils may be added after reaction of the polycarboxylic acid with the methylol phenyl derivative containing the epoxide unit. Among such oily materials which may be employed are, for example, castor oil, dehydrated castor oil, linseed oil fatty acids, coconut oil fatty acids, oiticica oil, tung oil, etc. Generally, I may use for the purpose any one of the many oils coming under the above generic disclosures which may normally be employed in the preparation of oil-modified alkyd resins which are well known in the art.

The compositions herein described may be mixed in varying proportions with various other compositions, for instance, with cellulose derivatives, phenolic resins, polyvinyl acetal resins (e. g., polyvinyl formal, polyvinyl butyral resins, etc.), alkyd resins, aminoplast resins, Ethoxyline resins, for instance, those disclosed in U. S. Patents 2,324,483 and 2,444,333, etc. Modifying agents such as fillers, catalysts, extenders, etc., may also be added if desired.

What I claim as new and desire to secure by Letters Patent of the United States is:

1. The process which comprises reacting epichlorohydrin with a mixture of ingredients containing as essential materials the three alkali-metal methylol phenates having the formulae:

(a) 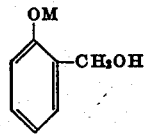

(b) 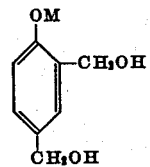

and
(c) 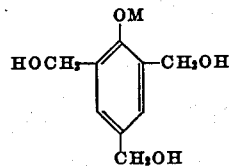

where M is an alkali metal atom, the tris(hydroxymethyl) phenate derivative comprising at least 10 per cent, by weight, of the mixture of the above-identified three alkali-metal methylol phenates, thereby to obtain a reaction product containing at least 28.3% methylol groups.

2. A composition of matter formed in accordance with the process described in claim 1.

3. The process which comprises reacting epichlorohydrin with a mixture of ingredients containing as essential materials the three sodium methylol phenates having the formulae:

(a) 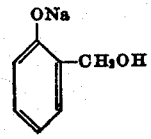

(b) 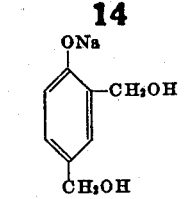

and
(c) 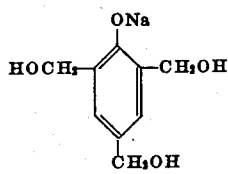

the tris(hydroxymethyl) phenate comprising at least 10 per cent, by weight, of the mixture of the above-identified three sodium methylol phenates, thereby to obtain a reaction product containing at least 28.3% methylol groups.

4. A composition of matter formed in accordance with the process described in claim 3.

5. The process which comprises reacting epichlorohydrin with a mixture of ingredients containing as essential materials the three alkali-metal phenates having the formulae:

(a) 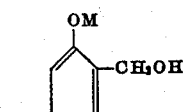

(b) 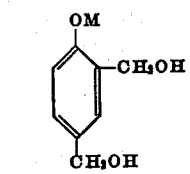

and
(c) 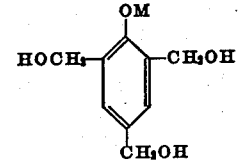

where M is an alkali metal atom, the tris(hydroxymethyl) phenate derivative comprising at least 10 per cent, by weight, of the mixture of the above-identified three alkali-metal methylol phenates, thereby to obtain a reaction product containing at least 28.3% methylol groups, and thereafter heating the aforesaid reaction product to effect intercondensation of the methylol groups.

6. The process as in claim 5 in which the heating is conducted in the presence of an acidic condensation catalyst.

7. The heat treated product obtained in accordance with the process of claim 5.

ROBERT W. MARTIN.

References Cited in the file of this patent

UNITED STATES PATENTS

| Number | Name | Date |
|---|---|---|
| 2,579,329 | Martin | Dec. 18, 1951 |
| 2,606,934 | Martin | Aug. 12, 1952 |
| 2,615,007 | Greenlee | Oct. 21, 1952 |
| 2,615,008 | Greenlee | Oct. 21, 1952 |

FOREIGN PATENTS

| Number | Country | Date |
|---|---|---|
| 576,177 | Germany | May 8, 1933 |
| 251,647 | Switzerland | Sept. 1, 1948 |